Patented Jan. 25, 1949

2,459,886

UNITED STATES PATENT OFFICE 2,459,886

SELENIUM RECTIFIER

Walter P. Krok, Lorain, Ohio, assignor, by mesne assignments, to Lorain Products Corporation, Lorain, Ohio, a corporation of Ohio No Drawing. Application November 2, 1945, Serial No. 626,440

8 Claims. (Cl. 175—366)

This invention deals with an improvement in selenium rectifiers, and particularly with a method for greatly improving the effectiveness of the blocking layer in selenium rectifiers.

In the manufacture of selenium rectifiers a metal plate, usually consisting of iron, nickel plated iron, or aluminum, is coated with a thin layer of selenium which may contain admixtures to increase its conductivity. The element is then subjected to one or more heat treatments. In the course of these treatments or during subsequent treatments, a barrier or blocking layer is formed on the surface of the selenium. After the blocking layer is provided, the rectifier is coated with a conducting counter-electrode, usually by spraying a low melting point alloy upon the blocking layer. The rectifier is then subjected to an electrical forming treatment to increase the resistance of the blocking layer and to thereby improve the rectifying ratio of the finished element.

It is an object of my invention to improve the rectifying ratio of a selenium rectifier by treating it with hydrochloric acid.

A further object of my invention is to stabilize the characteristics of a selenium rectifier and to provide a rectifier in which the forward resistance does not appreciably increase with use.

Another object of my invention is to increase the reverse resistance in a selenium rectifier without substantially increasing the forward resistance of the rectifier.

An additional object of my invention is to treat the surface of a selenium rectifier prior to the application of the counter-electrode and to thereby provide an improved blocking layer.

A still further object of my invention is to provide a simple and economical means for producing a highly effective, permanent blocking layer in a selenium rectifier.

Other objects of my invention will become apparent from the following description of my invention:

In accordance with my invention a supporting or base plate may be coated with selenium and heat treated according to any of the processes known in the art. The selenium element thus produced possesses a blocking layer which is more or less effective depending upon the composition of the selenium, the method of application, and the various steps in the preparation of the element. In some cases the blocking layer obtained in this manner may be considered adequate, but I have found that it is possible to greatly enhance the rectifying properties of the element by treating the selenium surface with hydrochloric acid prior to the application of the counter-electrode.

In my invention, the selenium surface may be treated in any one of several ways, such as by spraying, by fuming or by immersion. Thus, the hydrochloric acid may be sprayed on the selenium surface, or the selenium surface may be exposed to fumes of the type present over hydrochloric acid, or the element may be immersed in a hydrochloric acid solution. I have obtained highly advantageous results with all three of the methods mentioned. In any case the selenium surface is subjected to the action of the hydrochloric acid in order to enhance the rectifying properties of the barrier layer.

When the selenium elements are treated by immersion, I have found that best results are obtained with a dilute solution of hydrochloric acid, whereas the spraying and fuming processes utilize more concentrated solutions to best advantage. The exact procedure and equipment used in carrying out the hydrochloric acid treatment may be varied to suit production facilities.

After the counter-electrode has been applied, the elements may be subjected to an electroforming process to improve their rectifying ratio.

I have found that the treatment of the selenium surface with hydrochloric acid has very little effect upon the forward resistance of the finished element while it may increase the reverse resistance to a value ten to fifty times greater than that of an untreated element.

Thus, I have found that rectifying elements made in accordance with my invention possess an exceptionally high conductivity in the forward or conducting direction, and also have an extremely high resistance in the reverse or blocking direction. Furthermore, I have found that elements made according to my invention are exceptionally stable, and do not appreciably change their properties even after prolonged use. I am therefore able by my invention to produce rectifiers which not only have an extremely high conductivity when new, but maintain their high conductivity when placed in service.

I claim as my invention:

1. In the manufacture of a selenium element, the step which comprises spraying hydrochloric acid upon the surface of the element prior to the application of a counter-electrode.

2. In the manufacture of a selenium element, the step which comprises exposing the selenium surface to hydrochloric acid vapors.

3. A rectifier comprising a conducting base plate, a selenium layer thereon, said layer having a hydrochloric acid treated surface, and a counter-electrode in contact with said treated surface.

4. A selenium element comprising an iron member, a layer comprising selenium in intimate contact with said iron member, said layer having a hydrochloric acid treated surface, and a counterelectrode in contact with said treated surface.

5. The method for preparing a selenium rectifier element having a selenium layer supported on a base plate, which comprises exposing the surface of the selenium layer to fumes of the type present over concentrated hydrochloric acid, applying a counter-electrode to the fumed surface, and electro-forming the element.

6. The method for preparing a selenium element having a selenium layer supported on a base plate, which comprises exposing the surface of the selenium layer to the action of hydrochloric acid, applying a counter-electrode to said surface, and electro-forming the element.

7. The method for preparing a selenium element having a selenium layer supported on a base plate, which comprises spraying hydrochloric acid on the surface of the selenium layer, applying a counter-electrode to said surface, and electro-forming the element.

8. The method for preparing a selenium element having a selenium layer supported on a base plate which comprises immersing the element in a solution of hydrochloric acid, applying a counter-electrode to said layer, and electrode-forming the element.

WALTER P. KROK.

REFERENCES CITED

The following references are of record in the file of this patent:

UNITED STATES PATENTS

| Number | Name | Date |
| --- | --- | --- |
| 1,994,632 | Becker | Mar. 19, 1935 |
| 2,321,523 | Saslaw | June 8, 1943 |
| 2,375,355 | Lindblad | May 8, 1945 |